United States Patent [19]

Renfrew et al.

[11] Patent Number: 5,682,682
[45] Date of Patent: Nov. 4, 1997

[54] DIAL INDICATOR WITH CROWNED GEAR

[75] Inventors: Greg Renfrew, Johnston, R.I.; Hans Windler, Port, Switzerland

[73] Assignee: Federal Products Co., Providence, R.I.

[21] Appl. No.: 637,503

[22] Filed: Apr. 25, 1996

[51] Int. Cl.[6] ................................................ G01B 3/22
[52] U.S. Cl. ............................................ 33/556; 33/559
[58] Field of Search ..................................... 33/556, 559

[56] References Cited

U.S. PATENT DOCUMENTS

| | | |
|---|---|---|
| 1,433,076 | 10/1922 | Green . |
| 2,210,435 | 8/1940 | Ruf ............................................ 33/172 |
| 2,638,679 | 5/1953 | McSkimmon ............................. 33/172 |

Primary Examiner—Thomas B. Will
Attorney, Agent, or Firm—Morse, Altman & Benson

[57] ABSTRACT

A dial indicator comprising a body having an dial face with marked graduations; a longitudinally reciprocating rod extending from the body, the rod having a standard rack internal to the body and an end of the rod external to the body having a contact surface; an interacting series of gear assemblies inside the body, one of the gear assemblies having a crowned pinion, the crowned pinion being driven by the rack; and a dial hand attached to the axle of another of the gears; whereby longitudinal pressure on the contact surface causes the rod to retract longitudinally into the body, the distance of retraction being indicated by the dial hand on the dial face.

24 Claims, 5 Drawing Sheets

DIAL INDICATOR WITH CROWNED GEAR

BACKGROUND OF THE INVENTION

1. Field of the Invention

The present invention relates to dial indicators and, more particularly, to precision mechanical dial indicators for short linear measurements.

2. The Prior Art

A mechanical dial indicator uses a longitudinally reciprocating rod to measure a length or distance, typically lengths that are not more than 1 inch, and to display that length on a dial face. ASME/ANSI standard B89.1.10M-1987 (the "ASME Standard") requires that the graduations be in one of four classes of inch values (0.00005 inch, 0.0001 inch, 0.0005 inch, or 0.001 inch) or one of four classes of metric values (0.001 millimeter (mm), 0.002 mm, 0.01 mm, or 0.02 mm). Individual manufacturers may include other graduation sizes in their product lines, some as small as 0.00001 inch.

The ASME Standard defines three types of dial indicators: (1) type A having the reciprocating rod parallel to the dial face, (2) type B having the reciprocating rod perpendicular to the dial face, and (3) type C, also called a test indicator, having the reciprocating rod actuated by a lever. Regardless of the type of the indicator, the longitudinal motion of the reciprocating rod is translated to rotational motion for display on the dial face through the use of a rack and pinion. The rack is a flat arrangement of parallel gear teeth that is located on the surface of the reciprocating rod, parallel to the axis of the rod. The pinion is a spur gear that has a cylindrical shape with straight parallel teeth arranged circumferentially about the surface. The teeth of the pinion mesh with and are driven by the teeth of the rack, causing the pinion to rotate in response to the longitudinal movement of the rod. The rotational motion of the pinion is transferred, via other gears, to a rotating dial hand. The dial hand indicates, via markings on the dial face, the distance that the rod has traveled longitudinally relative to the pinion.

The ASME Standard requires that dial indicators meet certain levels of repeatability, hysteresis, and accuracy. Repeatability is the variation between a series of measurements of the same distance. Hysteresis is the dependence of a measurement on the previous position of the dial hand. In a dial indicator, hysteresis manifests itself as the difference in two measurements of the same distance, where, in one measurement, the distance is less than the previous hand position and, in the other measurement, the distance is greater than the previous hand position. Accuracy is the extent to which the measured distance approaches the actual distance. Table I shows the values for these three parameters as required to meet the ASME Standard.

TABLE I

| Least Graduation | | | | Deviation in Least Graduation | | |
| --- | --- | --- | --- | --- | --- | --- |
| | | | | | Accuracy | |
| inches | mm | Repeat | Hysteresis | First 2-1/3 revs | First 10 revs | First 20 revs |
| 0.00005 | 0.001 | ±0.2 | 0.50 | ±1 | ±4 | |
| 0.0001 | 0.002 | ±0.2 | 0.50 | ±1 | ±3 | ±4 |
| 0.0005 | 0.01 | ±0.2 | 0.33 | ±1 | ±3 | ±4 |
| 0.001 | 0.02 | ±0.2 | 0.33 | ±1 | ±2 | ±4 |

A major factor in the accuracy of mechanical dial indicators is the friction between the teeth of the pinion and rack.

In the pinion of the prior art dial indicator, the outer edge, also called the top land, of each tooth is flat; that is, the top land of each tooth is straight and parallel with the pinion axis of rotation. When the pinion and rack mesh, they make contact over the entire length of the tooth, maximizing the amount of friction.

The friction created by the contact between the rack and pinion teeth has a direct effect on any measurement taken by the dial indicator. The friction causes the pinion to rotate at an uneven rate. In other words, the rate of rotation of the pinion is non-linear. The accuracy of the dial indicator depends on the difference between the highest and lowest rates of rotation. The smaller the difference, the greater the accuracy. Thus, the greater the friction, the larger the difference, resulting in lower measurement accuracy.

Another factor in the accuracy of the dial indicator is the contact ratio between the rack and pinion. When the teeth of the pinion mesh with the teeth of the rack, there is a contact point between the pinion teeth and the rack teeth. Looking down the axis of rotation of the pinion, those contact points describe a circle about the pinion called the pitch circle. The corresponding contact points on the rack describe a straight line and is called the pitch line. Backlash is the difference between the width of a tooth at its contact point and the gap into which it meshes. Being a precision instrument, the backlash must be minimized to prevent inaccuracies in the measurement. As the backlash increases from zero, the pinion can rotate through a small arc even when the rack is not moving.

Another factor in the accuracy of the dial indicator measurement is the alignment between the rack and pinion. When the rack and pinion are properly aligned, the rotation axis of the pinion is at 90° to and parallel to the plane defined by the top lands of the rack teeth. Any misalignment of the rack and pinion, where the pinion axis and top land plane are not parallel, reduces the contact ratio, resulting in inaccuracies in the measurement.

Misalignment also changes the friction between the rack and pinion teeth. With the straight teeth in the dial indicators of the prior art, the amount of friction affects the measurement accuracy: the accuracy decreases as the amount of friction increases. However, when the rack and pinion become misaligned, the amount of friction changes because the area of contact between the pinion teeth and the rack teeth changes. This change in the amount friction causes the accuracy of the dial indicator to change.

Another consequence of misalignment is edge wearing. When the rack and pinion are misaligned, the contact between the rack teeth and pinion teeth occurs at the edge of the rack teeth or pinion teeth, depending on which is narrower. If the rack is narrower, the edge of the rack teeth wear a groove into the face of the pinion teeth and also wear down the edge of the pinion teeth. This wear changes the contact ratio between the rack and pinion, causing the accuracy of the dial indicator to change.

The main cause of misalignment in a mechanical dial indicator is rotation of the rod. As describe above, the dial indicator uses a longitudinally reciprocating rod. It is not intended that the rod rotate about its axis. If it does rotate, the pitch line changes orientation, causing the rack and pinion to become misaligned. With misalignment, the contact ratio is reduced.

Preventing the rod from rotating is a near impossible task if the reciprocating operation of the rod is to be maintained. In order to keep the rod from rotating, a mechanism such as a rack slide pin extending into a groove in the surface of the rod is used. The rack slide pin would have to fit perfecting into the groove, touching both sides but not inducing so much pressure on the sides of the groove that friction causes the rod to stick as it reciprocates. These two characteristics require extremely precise machining, which can be prohibitively expensive. In addition, even if the necessary tolerances are reached, they are difficult to maintain. Friction between the rack slide pin and groove will eventually cause wear to the point that they no longer fit properly.

Thus there continues to be a need to solve the problem of misalignment, the related problem of edge wear, and the corresponding change in friction between the rack and pinion of the dial indicator in order to maintain the indicator's accuracy.

SUMMARY OF THE INVENTION

The mechanical dial indicator implementing the present invention consists of a housing, a reciprocating rod, and a gear mechanism. The present invention contemplates implementation in all types of dial indicators including, but not limited to, ASME Standard type A, B, and C dial indicators.

The housing includes a body, a rear cover, a bezel, and a pair of opposed extensions. The housing body is generally a flat hollow cylinder. The rear cover optionally has a mounting lug and is removably attached to the rear of the body. The bezel is rotatably attached to the housing. The bezel is prevented from rotating by a clamp that applies pressure to the bezel in response to a finger-tightened screw. The outer edge of the bezel supports a transparent window, that is preferably outwardly curved. Visible through the window is a dial face that is marked with graduations, the spacing and units of which are dependent upon the ASME Standard class to which the dial indicator belongs or, if not a member of an ASME Standard class, selected by the producer. Extending radially from the outside surface of the body is a tubular lower stem. Extending radially from the outside surface of the body opposite from and axially aligned with the lower stem is a tubular upper stem.

The second component of the mechanical dial indicator is the reciprocating rod. The rod is located coincident with the axis of the lower stem and upper stem, extending into the upper stem and through the lower stem. A knob screws into a threaded hole at the lower stem end of the rod. The distal end of the knob is the contact surface, which is preferably constructed of a wear-resistant material that is preferably smooth and uniform. A rack is located on the outer surface of the rod inside the body. The rod is biased to extend out the lower stem by a coil spring. One end of the spring is attached to a protrusion from the body and the other end is attached to a protrusion extending perpendicularly from the rod.

The gear mechanism is a series of gears through which a small longitudinal movement of the rod is converted to a large rotational movement of a dial hand. The gear mechanism includes a conversion gear assembly, an intermediate gear assembly, a center pinion, and a take up gear assembly. The rack drives the conversion gear assembly, the conversion gear assembly drives the intermediate gear assembly, and the intermediate gear assembly drives the center pinion. The center pinion axle extends through a hole in the dial face where the dial hand is attached.

The take up gear assembly is driven by the center pinion when the rod is retracting into the body. When driven, a hairspring surrounding the take up gear assembly axle is compressed. When the rod is projecting from the body, the hairspring uncompresses to put pressure on the gear series to keep all gear movement on the same side of the gear teeth so that backlash is minimized.

There are two preferred embodiments of the present invention. In the first embodiment, the rack has standard teeth and the conversion pinion, the pinion that is driven by the rack, is crowned. In the second embodiment, the conversion pinion has standard teeth and the rack is crowned. When standard gears mesh, they make contact along a straight line on the face of the teeth. In a crowned tooth, the contact line is not straight, but is curved. The result is that the teeth make contact at only one point instead of along a line. This results in much lower friction between the gears. It also means that the amount of friction remains constant even if the gears are out of alignment. Both of these characteristics increase the accuracy of the dial indicator of the present invention. Note that the amount of the curve of the contact line is independent of other physical dimensions of the tooth, particularly the curve of the top land of the tooth.

An object of the present invention is to improve the accuracy, hysteresis, and repeatability of dial indicator measurements by reducing the amount of friction induced between the rack of the reciprocating rod and the pinion driven by the reciprocating rod.

Another object is to improve the accuracy, hysteresis, and repeatability of dial indicator measurements by keeping the amount of friction between the rack and pinion substantially constant within a range of alignments of the rack and pinion gears.

A further object is to improve the accuracy, hysteresis, and repeatability of dial indicator measurements by substantially eliminating edge wear within a range of alignments of the rack and pinion gears.

BRIEF DESCRIPTION OF THE DRAWINGS

For a fuller understanding of the nature and object of the present invention, reference is made to the accompanying drawings, wherein.

DETAILED DESCRIPTION

Basic Embodiment of the Dial Indicator

Figure 1:
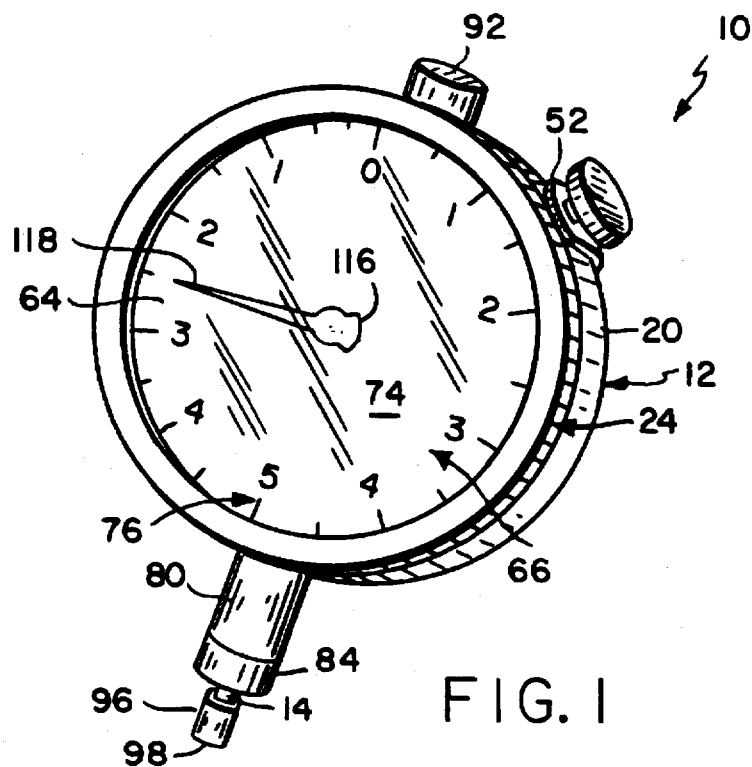
FIG. 1 is a front, perspective view of a dial indicator implementing the present invention.
Figure 2:
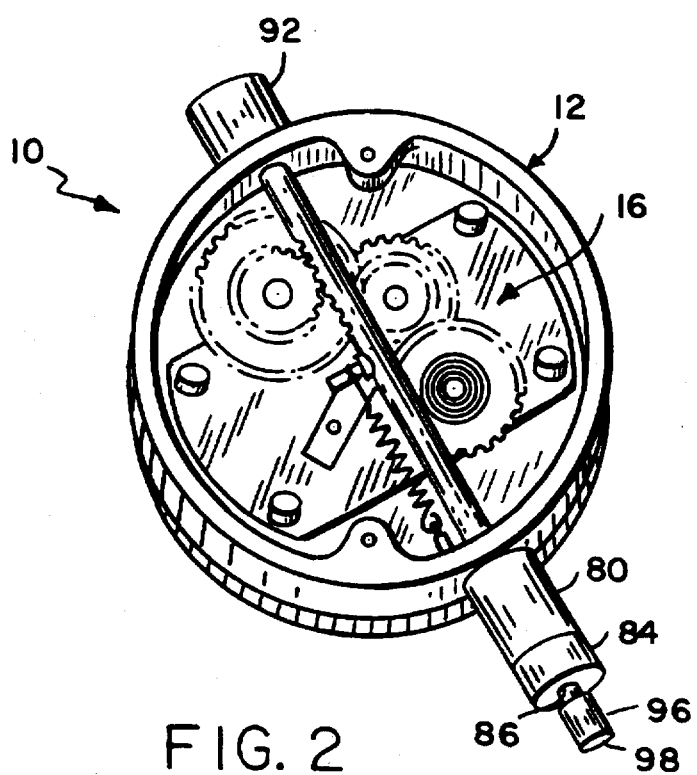
FIG. 2 is a rear, perspective view without the rear cover of the dial indicator of FIG. 1.
Figure 3:
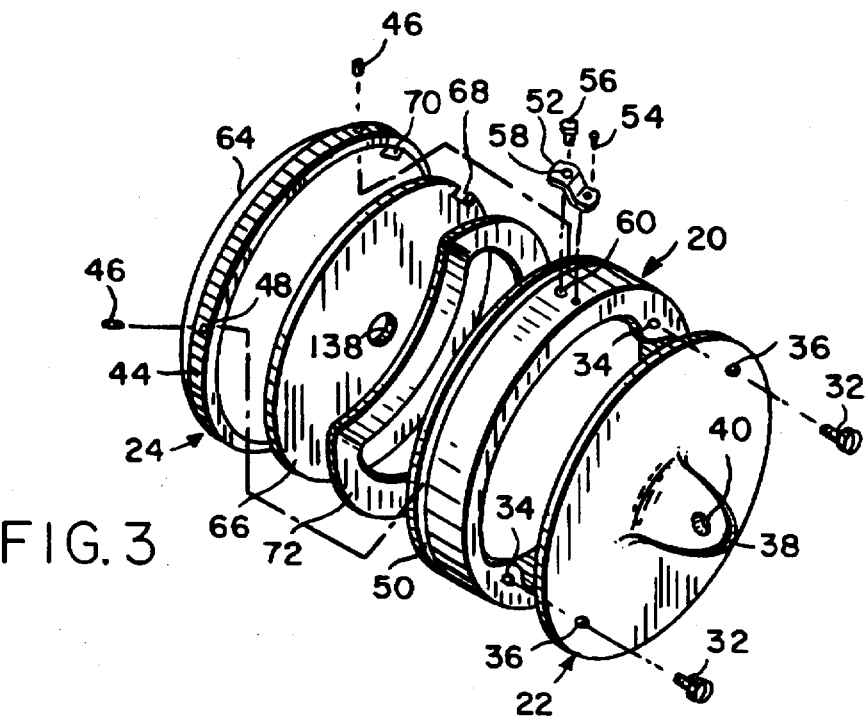
FIG. 3 is an exploded, perspective view of a portion of the dial indicator of FIG. 1.
Figure 4:
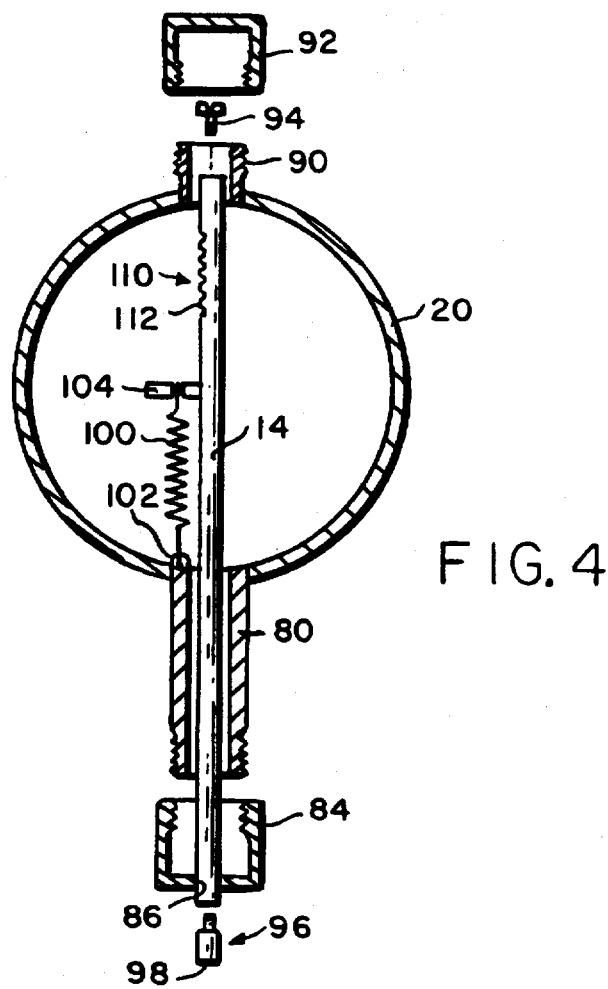
FIG. 4 is an exploded, partially cross-sectional view of a portion of the dial indicator of FIG. 1.

A mechanical dial indicator 10 implementing the present invention is shown in FIGS. 1 and 2, and consists of a housing 12, a reciprocating rod 14, and a gear mechanism 16. The example shown in this detailed description is an ASME Standard type A dial indicator, but the present invention contemplates implementation in all types of dial indicators including, but not limited to, ASME Standard type A, B, and C dial indicators.

The housing 12 includes a body 20, a rear cover 22, a bezel 24, and a pair of opposed extensions 80, 90. The housing body 20 is generally a flat hollow cylinder. The diameter of the housing 12 depends on the ASME Standard group number to which the particular dial indicator belongs as described in Table II below. The depth of the housing 12 is preferably in the range of from ½ inch to ¾ inch.

Removably attached to the rear of the body 20 is a rear cover 22. The rear cover 22 is a flat sheet of the same material as the body 20 and is preferably attached to the body 20 by a plurality of screws 32 that extend through holes 36 in the rear cover and turn into a like number of threaded holes in the body 34. Optionally, a mounting lug 38 extends outwardly from the back of the rear cover 22. The mounting lug 38 can have a variety of shapes depending on the expected use of the dial indicator 10. In a first configuration, the mounting lug 38 extends perpendicularly from the rear cover 22 and is substantially flat with a through hole 40, where the through hole 40 axis is parallel to and about 5/16 inch from the rear cover 22. In another configuration, the mounting lug is a cylinder with or without a threaded axial hole. In yet another configuration, the mounting lug is a flat disk with a bisecting groove and a threaded hole.

Rotatably attached to the face of the housing is a bezel 24. The bezel 24 is a ring that fits around the outside of the housing body 20. The outer surface of the bezel 24 is knurled, as at 44. There are preferably a plurality of evenly-spaced screws 46 that extend through threaded holes 48 in the outer surface of the bezel 24 and into an annular groove 50 in the body 20. The screws 46 prevent the removal of the bezel 24 from the body 20, but do not prevent the bezel 24 from rotating. The bezel 24 is prevent from rotating by a clamp 52 attached by a pivot 54 to the outside surface of the body 20. The clamp 52 prevents the bezel 24 from rotating by applying pressure to the knurled portion 44 of the bezel 24. The pressure is applied by a finger-tightened screw 56 that extends through a hole 58 in the clamp 52 and into a threaded hole 60 in the body 20.

The diameter of the bezel 24 is regulated by the ASME Standard and depends on the group number to which the particular dial indicator 10 belongs. The ranges for the bezel diameters are described in Table II below.

TABLE II

| Size | Nominal Bezel Diameters | | | |
|---|---|---|---|---|
| | Greater Than | | Up to and Including | |
| Group | inches | mm | inches | mm |
| 0 | 1 | 25 | 1-3/8 | 35 |
| 1 | 1-3/8 | 35 | 2 | 50 |
| 2 | 2 | 50 | 2-3/8 | 60 |
| 3 | 2-3/8 | 60 | 3 | 76 |
| 4 | 3 | 76 | 3-3/4 | 95 |

The outer edge of the bezel 24 supports a transparent window 64. The window 64 is preferably outwardly curved.

Visible through the window 64 is a dial face 66, which is a flat sheet of material. There is a notch 68 in the edge of the dial face 66 that mates with a corresponding protrusion 70 in the bezel 24. The mating of the notch 68 and protrusion 70 causes the dial face 66 to rotate with the bezel 24. The notch 68 and protrusion 70 are kept mated by a spring 72 located between the dial face 66 and the body 20 that biases the dial face 66 away from the body 20. The spring 72 preferably has a ring shape and an undulant surface. The outer surface 74 of the dial face 66 is marked with graduations 76, the spacing and units of which are dependent upon the ASME Standard class to which the dial indicator 10 belongs. In addition to the ASME Standard classes, a producer may have dial indicators with spacings and units that differ from the ASME Standard. For example, a dial indicator that has a unit of 0.00001 inch would be more accurate than a dial indicator meeting the ASME Standard.

Extending radially from the outside surface of the body 20 is a lower stem 80. The lower stem 80 is tubular with a circular cross-section and an outside diameter of approximately ⅜ inch. The distal end of the lower stem 82 is externally threaded to accept an internally threaded cap 84. The cap 84 has a circular hole 86 that, when the cap 84 is threaded onto the lower stem 80, is aligned with the axis of the lower stem 80. The distance that the lower stem 80/cap 84 extends from the body 20 depends upon the ASME Standard group to which the dial indicator 10 belongs and is discussed below relative to the reciprocating rod 14.

Extending radially from the outside surface of the body 20 opposite from and axially aligned with the lower stem 80 is a upper stem 90. The upper stem 90 is tubular with a circular cross-section and an outside diameter of approximately ⅜ inch. The external surface of the upper stem 90 is threaded to accept an internally threaded dust cap 92. With the dust cap 92 threaded onto the upper stem 90, the upper stem 90/dust cap 92 combination extends between ¼ and ½ inch from the surface of the body 20.

The second component of the mechanical dial indicator is the reciprocating rod 14. The rod has a substantially circular cross-section and a diameter of approximately 5/32 inch. The rod 14 is located coincident with the axis of the lower stem 80 and upper stem 90, extending into the upper stem 90 and through the axial hole 86 of the lower stem cap 84 when the cap 84 is installed on the lower stem 80. The dust cap 92, when installed on the upper stem 90, prevents the rod 14 from extending out the distal end of the upper stem 90. A capture screw 94 threaded into a threaded hole at the upper stem end of the rod 14 helps hold the rod 14 in position and acts to set the upper limit of the reciprocating movement of the rod 14.

A knob 96 screws into a threaded hole at the lower stem end of the rod 14. The distal end of the knob 96 is the contact surface 98, which is preferably constructed of a wear-resistant material, such as hardened steel, tungsten carbide, or diamond. The shape of the surface can range from flat to convex to tapered with a radius of curvature at the tip as small as 0.01 inch. The contact surface is preferably smooth and uniform. The ASME Standard proscribes the minimum distance between the contact surface 98 and the center of the through hole 40 of the first mounting lug configuration. These distances are set out in Table III below. The diameter of the knob 96 is larger than that of the rod 14, so a shoulder is created, which acts as a stop that sets the minimum distance between the contact surface 98 and the center of the through hole 40. The length of the lower stem 80 depends on the minimum distance as set out in Table III and the length of the knob 96.

TABLE III

| Size Group | Minimum Distance | |
|---|---|---|
| | inches | mm |
| 0 | 1-9/32 | 31 |
| 1 | 1-5/8 | 41 |
| 2 | 2 | 50 |
| 3 | 2-1/8 | 54 |
| 4 | 2-9/16 | 65 |

The rod 14 is biased to extend out the axial hole 86 of the cap 84 by a coil spring 100. One end of the spring 100 is attached to a protrusion 102 from the body 20 near the lower stem 80. The other end of the spring 100 is attached a protrusion 104 extending perpendicularly from the rod 14.

The rack 110 is located on the outer surface of the rod 14. The number and location of the teeth 112 depend upon the ASME Standard group to which the dial indicator 10 belongs and its measurement range. The details of the rack 110 are described below for each of the preferred embodiments.

The gear mechanism 16 is a series of spur gears through which a small longitudinal movement of the rod 14 is converted to a large rotational movement of a dial hand 118. The ratio of rod 14 movement to dial hand 118 movement, and consequently, the design of the gears, depends upon the range and resolution that the dial indicator 10 is intended to measure. Typically, the ratio will be such that one revolution of the dial hand 118 equates to 100 times the least graduation and the full range will be displayed in 2½ revolutions. For example, in a dial indicator with a least graduation of 0.0001 inch, one revolution will indicate 0.01 inch and the full range will indicate 0.025 inch.

The first assembly in the series is the conversion gear assembly 120. It has a pinion 122, called the conversion pinion, and a wheel 124, called the conversion wheel. The conversion pinion 122 is driven by the rack 110, which turns the conversion wheel 124. The preferred diametral pitch of the conversion pinion is in the range of 120 to 130. The remainder of the details of the conversion pinion 122 are described below with reference to the preferred embodiments.

The second assembly in the series is the intermediate gear assembly 126, which has an intermediate pinion 128 and an intermediate wheel 130. The conversion wheel 124 drives the intermediate pinion 128, which turns the intermediate wheel 130.

The final assembly in the series is the center pinion 132, which has only a pinion 134 and an axle 136. The center pinion 134 is driven by the intermediate wheel 130. The axle 136 extends through a hole 138 in the center of the dial face 66.

An additional gear assembly is used in the gear mechanism 16, called the take up gear assembly 140, which meshes with the center pinion 134. The take up gear assembly 140 is preloaded by a hairspring 142 surrounding the take up axle, biasing the take up gear assembly 140 in the nominal or "no measurement" direction. The purpose of the take up gear assembly 140 is to put pressure on the gear series to keep all gear movement on the same side of the gear teeth so that backlash is minimized.

Figure 6:
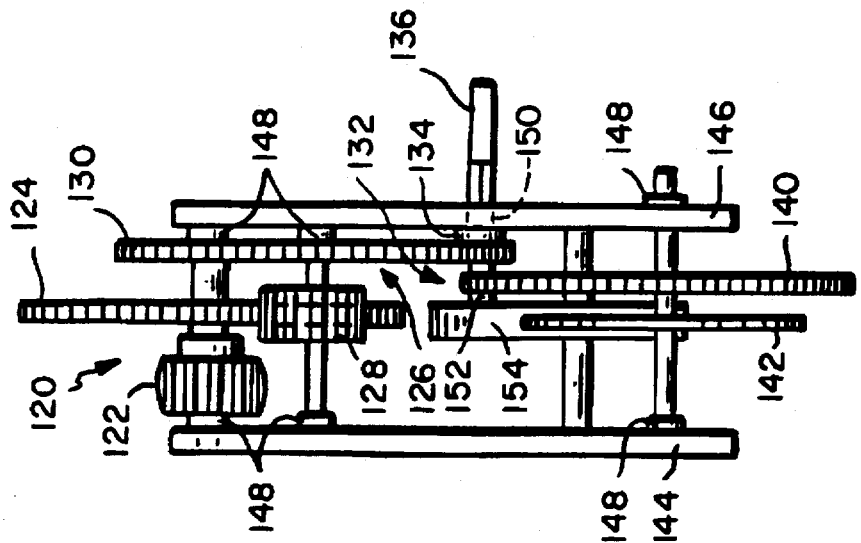
FIG. 6 is a side view of the gear mechanism of FIG. 5.
Figure 5:
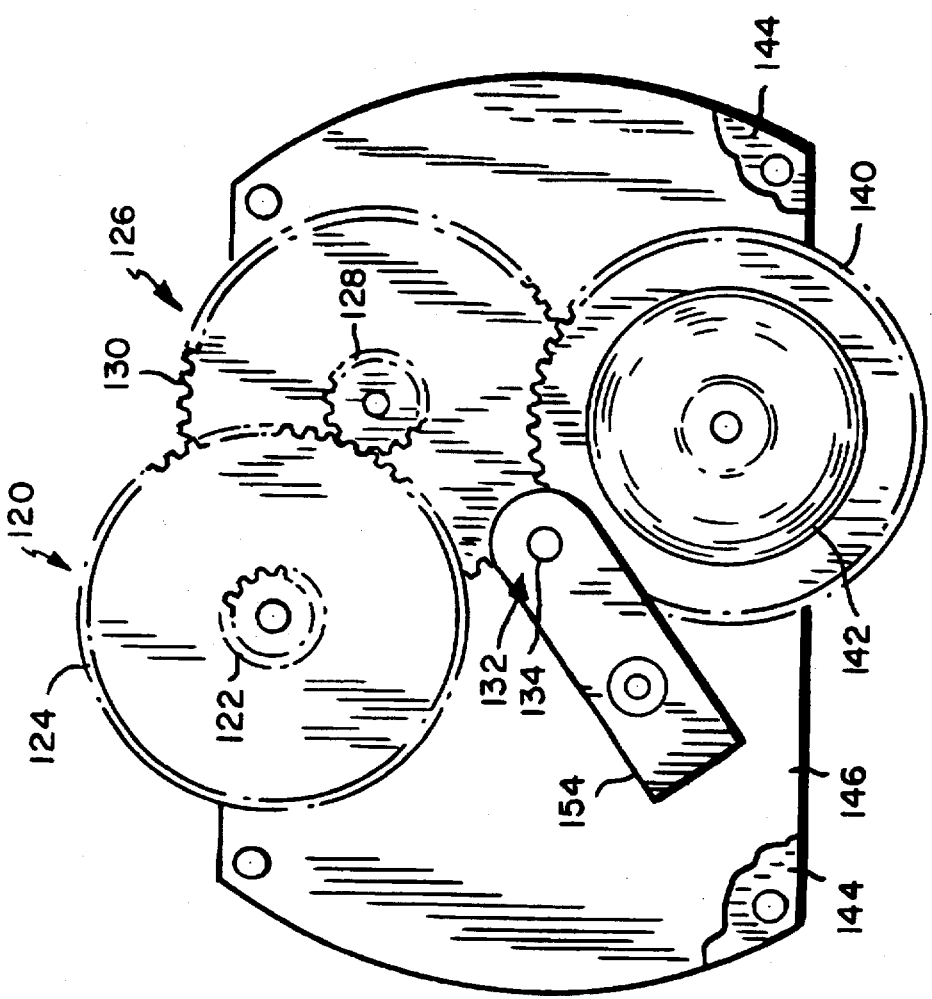
FIG. 5 is a rear view of the gear mechanism of type A, groups 2, 3, and 4 dial indicators.
Figure 7:
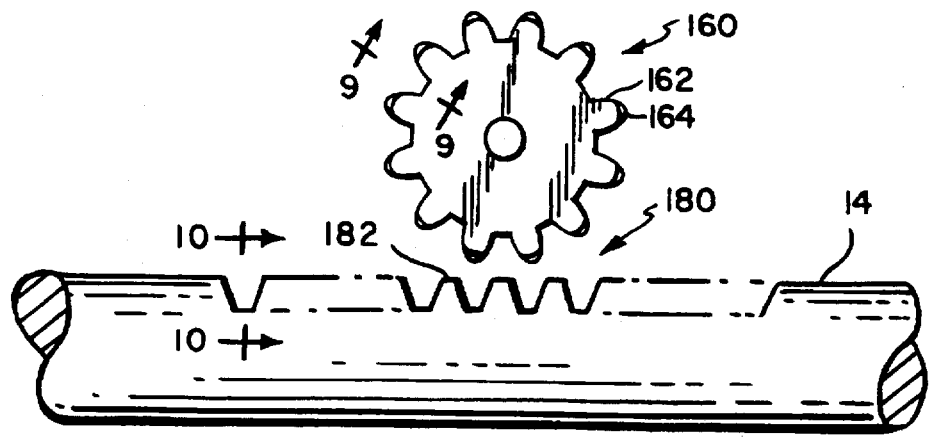
FIG. 7 is an enlarged, exploded side view of the rack and conversion pinion of the first embodiment of the present invention.
Figure 8:
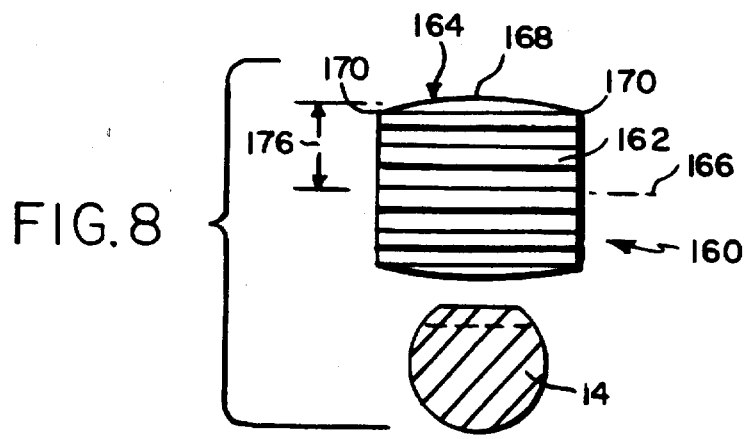
FIG. 8 is an enlarged partial cross-sectional view of the rack and conversion pinion of the embodiment of FIG. 7.
Figure 9:
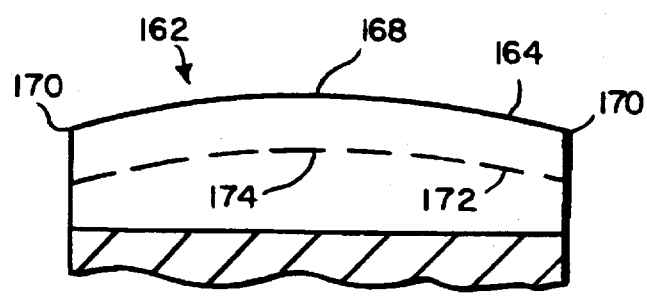
FIG. 9 is an enlarged view of the conversion pinion tooth of the embodiment of FIG. 7 along the line 9—9.
Figure 10:
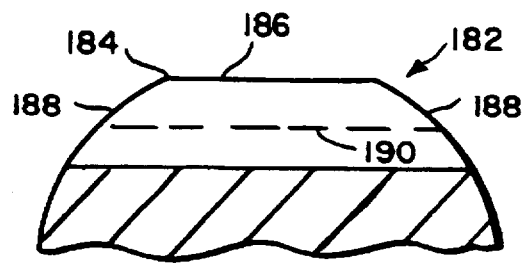
FIG. 10 is an enlarged view of the rack tooth of the embodiment of FIG. 7 along the line 10—10.

The conversion gear assembly 120, intermediate gear assembly 126, and take up gear assembly 140 are held in place between a pair of opposed plates 144, 146, both of which are parallel to the dial face 66. There are holes in the plates that hold bearings 148 for the axles of these gear assemblies. The reciprocating rod 14 also passes between the plates along the diameter of the body 20. As a result, the center pinion axle 136 cannot be held by both plates 144, 146. One of the center pinion bearings 150 is located in the plate immediately behind the dial face 146 and the other center pinion bearing 152 is located in a zinc block 154 mounted between the plates 144, 146. Preferably, all of the bearings 148, 150, 152 are sapphire. The locations of the gear assemblies between the plates 144, 146 depend on the ASME Standard group number of the dial indicator. FIGS. 5 and 6 show example gear assembly locations for ASME Standard type A, groups 2, 3, and 4 dial indicators. The gear assembly locations will be different for the different types and groups of dial indicators.

The dial hand 118 is permanently attached to the end of the axle of the center pinion 136 that extends through the center of the dial face 66. It extends radially from the axle 136 to the graduations 76 on the dial face 66, tapering to a point at its outer end. Also attached to the center pinion axle 136 is a counterweight 116, so that the rotation of the center pinion 132 is balanced. The amount of counterweight 116 necessary is determined by the weight of the dial hand 118 at the center pinion axle 136.

First Embodiment

The objects of the present invention are to reduce the effects of misalignment between the rack 110 and conversion pinion 122 within a small range of alignment, namely to reduce the amount of friction induced between the rack 110 and the conversion pinion 122, to keep the amount of such friction substantially constant, and to substantially eliminate edge wear. The result is a dial indicator with a maximized accuracy that does not change as the alignment of the rack 110 and conversion pinion 122 changes.

In the first embodiment, shown in FIGS. 7 to 10, these objects are met by using a standard rack 180 and a conversion pinion 160 that is crowned or barreled. In a normal conversion pinion, the contact points between the conversion pinion tooth 162 and the rack tooth 182 describe a straight line along the length of the conversion pinion tooth 162. In a crowned conversion pinion 160, the contact points describe an arc, as at 172. The contact arc 172 is very shallow. For example, in a conversion pinion with a diameter at the center 176 of approximately 0.183 inch, the radius of curvature of the contact arc 172 is between 1.400 and 1.600 inches. Note that the radius of curvature of the contact arc 172 is independent of other physical dimensions of the tooth 162, particularly the curve of the top land 164.

Meshing with the crowned conversion pinion 160 is the rack 180. In this first embodiment, the rack 180 has standard teeth 182. Although, the top land 184 of the rack tooth 180 is flat in the center, as at 186, and follows the curve of the outer surface of the rod 14 at its outer ends, as at 188, the contact points describe a straight line, as at 190.

With a crowned conversion pinion 160, the rack tooth 182 and conversion pinion tooth 162 make contact at only one point along the contact line 172 of the conversion pinion tooth 162, rather than along the entire contact line of the tooth, as in the conversion pinions of the prior art. With a fixed contact ratio in the preferred range of from 1.5 to 2.0, this single contact point minimizes the friction between the rack and conversion pinion 160. When the rack 180 and conversion pinion 160 are aligned at right angles to each other, the contact point is in the center of the contact line 172, as at 174. If the rack 180 and conversion pinion 160 should become misaligned, for example, by rotating the rod 14 on its axis, the contact point moves off the center of the contact line 172, but the contact area does not change. As a result, friction between the rack 180 and conversion pinion 160 remains the same within approximately 5 degrees of alignment.

Second Embodiment

In the second embodiment, shown in FIGS. 11 to 14, the main objective of the present invention is met by using a standard conversion pinion and a rack 200 that is crowned.

Figure 11:
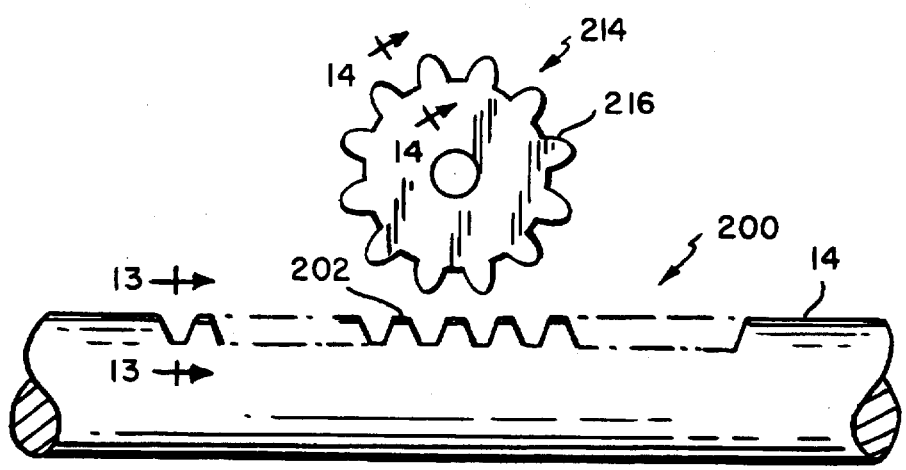
FIG. 11 is an enlarged, exploded side view of the rack and conversion pinion of the second embodiment of the present invention.
Figure 12:
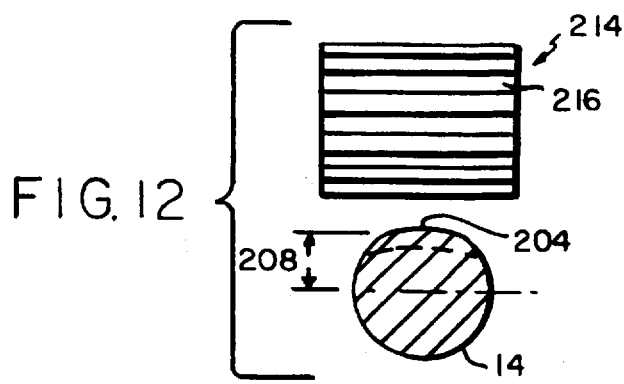
FIG. 12 is an enlarged partial cross-sectional view of the rack and conversion pinion of the embodiment of FIG. 11.
Figure 13:
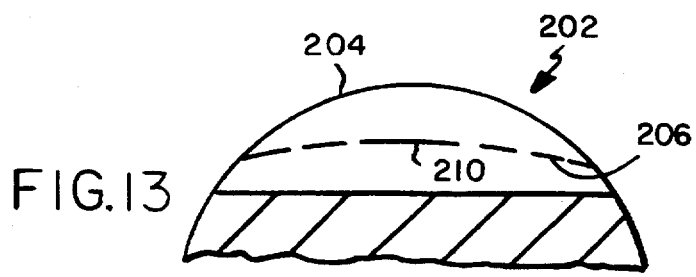
FIG. 13 is an enlarged view of the rack tooth of the embodiment of FIG. 11 along the line 13—13.
Figure 14:
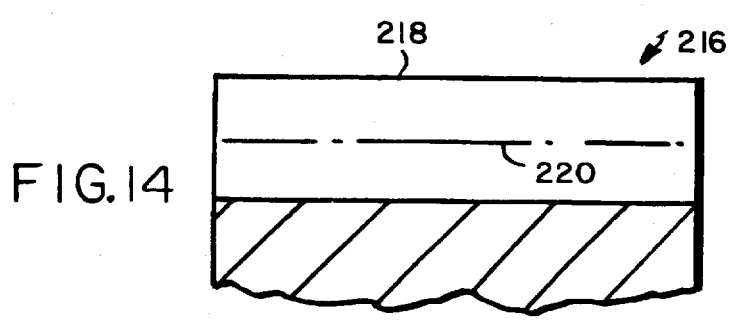
FIG. 14 is an enlarged view of the conversion pinion tooth of the embodiment of FIG. 11 along the line 14—14.

The racks of the prior art have standard teeth, as in FIG. 11. Although, the top land of the standard rack tooth is flat in the center and follows the curve of the outer surface of the rod at its outer ends, the contact points describe a straight line. In the crowned rack 200 of the present invention, the contact points describe an arc, as at 206. The contact arc 206 is very shallow. For example, in a rod 14 with a diameter 208 of approximately 0.156 inch, the radius of curvature of the contact arc 206 is between 1.400 and 1.600 inches. Note that the radius of curvature of the contact arc 206 is independent of other physical dimensions of the tooth 202, particularly the curve of the top land 204.

Meshing with the crowned rack is the conversion pinion 214. The conversion pinion 214 in this second embodiment has standard teeth 216, where the top land 218 is flat and parallel to the conversion pinion axis and the contact points describe a straight line, as at 220.

The crowned rack 100 and conversion pinion 214 make contact at only one point along the contact arc 206 of the crowned rack tooth 202, rather than along the entire contact line of the tooth, as in the racks of the prior art. With a fixed contact ratio in the preferred range of from 1.5 to 2.0, this single contact point minimizes the friction between the crowned rack 200 and conversion pinion 214. When the crowned rack 200 and conversion pinion 182 are aligned at right angles to each other, the contact point is in the center of the contact arc 206, as at 210. If the crowned rack 200 and conversion pinion 214 should become misaligned, for example, by rotating the rod 14 on its axis, the contact point moves off the center of the contact line 206, but the contact area does not change. The result is that the friction between the crowned rack 200 and conversion pinion 214 remains the same within approximately 5 degrees of alignment.

OPERATION

The dial indicator of the present invention operates in the same manner as the dial indicators of the prior art. The rod 14 is initially biased out of the end of the body 12. As the rod 14 is pushed into the body 12, the rod rack 110 drives the conversion pinion 122. The conversion pinion 122 drives the rest of the gear assemblies of the gear mechanism 16, resulting in the needle 118 indicating on the dial face graduations 76 the distance that the rod 14 was pushed into the body 12. As the center pinion 132 rotates, it drives the take up gear assembly 140, winding the hairspring 142.

When the pressure on the rod 14 is released, the coil spring 100 biases the rod 14 back out of the body 12. The hairspring 142 puts pressure on the take up gear assembly 140, which puts pressure on the gears to keep all gear movement on the same side of the gear teeth so that backlash is minimized.

What is claimed is:

1. A dial indicator comprising:
   (a) a body having an dial face with marked graduations;
   (b) a longitudinally reciprocating rod extending from said body, said rod having a standard rack internal to said body and an end of said rod external to said body having a contact surface;
   (c) an interacting series of gear assemblies inside said body, one of said gear assemblies having a crowned pinion, said crowned pinion being driven by said rack; and
   (d) a dial hand attached to the axle of another of said gear assemblies;
   (e) whereby longitudinal pressure on said contact surface causes said rod to retract longitudinally into said body, the distance of retraction being indicated by said dial hand on said dial face.

2. The dial indicator of claim 1 wherein said dial face has 100 equally spaced graduations and the difference between two adjacent of said graduations indicates a distance in the range of from 0.00001 inch to 0.001 inch.

3. The dial indicator of claim 1 wherein said body includes a selectively rotating bezel, said bezel including a substantially transparent window through which said dial face is visible, and said bezel being selectively prohibited from rotating by a bezel clamp.

4. The dial indicator of claim 1 wherein said rod is biased out of said body when no longitudinal pressure is applied to said contact surface.

5. The dial indicator of claim 1 wherein said crowned pinion has a diametral pitch in the range of from approximately 120 to approximately 130.

6. The dial indicator of claim 1 wherein each tooth of said crowned pinion has a contact arc radius of curvature in the range of from approximately 1.4 inches to approximately 1.6 inches.

7. The dial indicator of claim 1 wherein said series of gear assemblies includes a conversion gear assembly, an intermediate gear assembly, and a center pinion, said crowned pinion being on said conversion gear assembly, said conversion gear assembly driving said intermediate gear assembly, and said intermediate gear assembly driving said center pinion, said dial hand attached to the axle of said center pinion.

8. The dial indicator of claim 7 wherein said series of gear assemblies includes a take up gear assembly having a hairspring, said center pinion driving said take up gear assembly causing said hairspring to be compressed when said rod is retracting into said body, and said hairspring uncompressing and causing said take up gear assembly to drive said center pinion when said rod is being projected out of said body, whereby the backlash between said gear assemblies is minimized.

9. A dial indicator comprising:
   (a) a body having an dial face with 100 equally spaced marked graduations, the difference between two adjacent of said graduations indicating a distance in the range of from 0.00001 inch to 0.001 inch;
   (b) said body including a selectively rotating bezel, said bezel including a substantially transparent window through which said dial face is visible, and said bezel being selectively prohibited from rotating by a bezel clamp;
   (c) said body including a lower stem extending from said body;
   (d) a longitudinally reciprocating rod having a standard rack internal to said body and an external end having a contact surface extending out of said lower stem;
   (e) said rod being biased out of said body when no longitudinal pressure is applied to said contact surface;

(f) an interacting series of gear assemblies inside said body, one of said gear assemblies having a crowned pinion, said crowned pinion being driven by said rack; and (g) a dial hand attached to the axle of another of said gears;

(h) whereby longitudinal pressure on said contact surface causes said rod to retract longitudinally into said body, the distance of retraction being indicated by said dial hand on said dial face.

10. The dial indicator of claim 9 wherein said crowned pinion has a diametral pitch in the range of from approximately 120 to approximately 130.

11. The dial indicator of claim 9 wherein each tooth of said crowned pinion has a contact arc radius of curvature in the range of from approximately 1.4 inches to approximately 1.6 inches.

12. The dial indicator of claim 9 wherein said series of gear assemblies includes:

(a) a conversion gear assembly, an intermediate gear assembly, a center pinion, and a take up gear assembly;

(b) said take up gear assembly having a hairspring;

(c) said crowned pinion being on said conversion gear assembly;

(d) said dial hand attached to the axle of said center pinion;

(e) said conversion gear assembly driving said intermediate gear assembly, said intermediate gear assembly driving said center pinion, and said center pinion driving said take up gear assembly when said rod is retracting into said body, causing said hairspring to be compressed; and (f) said hairspring uncompressing and causing said take up gear assembly to drive said center pinion when said rod is being projected out of said body, whereby the backlash between said gear assemblies is minimized.

13. A dial indicator comprising:

(a) a body having an dial face with 100 equally spaced marked graduations, the difference between two adjacent of said graduations indicating a distance in the range of from 0.00001 inch to 0.001 inch;

(b) said body including a selectively rotating bezel, said bezel including a substantially transparent window through which said dial face is visible, and said bezel being selectively prohibited from rotating by a bezel clamp;

(c) said body including a lower stem extending from said body;

(d) a longitudinally reciprocating rod having a standard rack internal to said body and an external end extending out of said lower stem;

(e) said rod external end having a contact surface, said contact surface being composed of a wear-resistant material and being substantially smooth;

(f) said rod being biased out of said body when no longitudinal pressure is applied to said contact surface;

(g) a series of gear assemblies inside said body, said series including a conversion gear assembly, an intermediate gear assembly, a center pinion, and a take up gear assembly, said conversion gear assembly including a crowned pinion, a dial hand attached to the axle of said center pinion, and said take up gear assembly having a hairspring;

(h) said rack driving said crowned pinion, said conversion gear assembly driving said intermediate gear assembly, said intermediate gear assembly driving said center pinion, and said center pinion driving said take up gear assembly when said rod is retracting into said body, causing said hairspring to be compressed;

(i) said hairspring uncompressing and causing said take up gear assembly to drive said center pinion when said rod is being projected out of said body, whereby the backlash between said gear assemblies is minimized;

(j) said crowned pinion having a diametral pitch in the range of from approximately 120 to approximately 130; and (k) each tooth of said crowned pinion having a contact arc radius of curvature in the range of from approximately 1.4 inches to approximately 1.6 inches;

(l) whereby longitudinal pressure on said contact surface causes said rod to retract longitudinally into said body, the distance of retraction being indicated by said dial hand on said dial face.

14. A dial indicator comprising:

(a) a body having an dial face with marked graduations;

(b) a longitudinally reciprocating rod extending from said body, said rod having a crowned rack internal to said body and an end of said rod external to said body having a contact surface;

(c) an interacting series of gear assemblies inside said body, said series being driven by said crowned rack; and (d) a dial hand attached to the axle of one of said gear assemblies;

(e) whereby longitudinal pressure on said contact surface causes said rod to retract longitudinally into said body, the distance of retraction being indicated by said dial hand on said dial face.

15. The dial indicator of claim 14 wherein said dial face has 100 equally spaced graduations and the difference between two adjacent of said graduations indicates a distance in the range of from 0.00001 inch to 0.001 inch.

16. The dial indicator of claim 14 wherein said body includes a selectively rotating bezel, said bezel including a substantially transparent window through which said dial face is visible, and said bezel being selectively prohibited from rotating by a bezel clamp.

17. The dial indicator of claim 14 wherein said rod is biased out of said body when no longitudinal pressure is applied to said contact surface.

18. The dial indicator of claim 14 wherein each tooth of said crowned rack has a contact arc radius of curvature in the range of from approximately 1.4 inches to approximately 1.6 inches.

19. The dial indicator of claim 14 wherein said series of gear assemblies includes a conversion gear assembly, an intermediate gear assembly, and a center pinion, said crowned rack driving said conversion gear assembly, said conversion gear assembly driving said intermediate gear assembly, and said intermediate gear assembly driving said center pinion, said dial hand attached to the axle of said center pinion.

20. The dial indicator of claim 19 wherein said series of gear assemblies includes a take up gear assembly having a hairspring, said center pinion driving said take up gear assembly causing said hairspring to be compressed when said rod is retracting into said body, and said hairspring uncompressing and causing said take up gear assembly to drive said center pinion when said rod is being projected out of said body, whereby the backlash between said gear assemblies is minimized.

21. A dial indicator comprising:
(a) a body having an dial face with 100 equally spaced marked graduations, the difference between two adjacent of said graduations indicating a distance in the range of from 0.00001 inch to 0.001 inch;
(b) said body including a selectively rotating bezel, said bezel including a substantially transparent window through which said dial face is visible, and said bezel being selectively prohibited from rotating by a bezel clamp;
(c) said body including a lower stem extending from said body;
(d) a longitudinally reciprocating rod having a crowned rack internal to said body and an external end having a contact surface extending out of said lower stem;
(e) said rod being biased out of said body when no longitudinal pressure is applied to said contact surface;
(f) an interacting series of gear assemblies inside said body, said series being driven by said crowned rack; and
(g) a dial hand attached to one of said gear assemblies;
(h) whereby longitudinal pressure on said contact surface causes said rod to retract longitudinally into said body, the distance of retraction being indicated by said dial hand on said dial face.

22. The dial indicator of claim 21 wherein each tooth of said crowned rack has a contact arc radius of curvature in the range of from approximately 1.4 inches to approximately 1.6 inches.

23. The dial indicator of claim 21 wherein said series of gear assemblies includes:
(a) a conversion gear assembly, an intermediate gear assembly, a center pinion, and a take up gear assembly;
(b) said take up gear assembly having a hairspring;
(c) said dial hand attached to the axle of said center pinion;
(d) said crowned rack driving said conversion gear assembly, said conversion gear assembly driving said intermediate gear assembly, said intermediate gear assembly driving said center pinion, and said center pinion driving said take up gear assembly when said rod is retracting into said body, causing said hairspring to be compressed; and
(e) said hairspring uncompressing and causing said take up gear assembly to drive said center pinion when said rod is being projected out of said body, whereby the backlash between said gear assemblies is minimized.

24. A dial indicator comprising:
(a) a body having an dial face with 100 equally spaced marked graduations, the difference between two adjacent of said graduations indicating a distance in the range of from 0.00001 inch to 0.001 inch;
(b) said body including a selectively rotating bezel, said bezel including a substantially transparent window through which said dial face is visible, and said bezel being selectively prohibited from rotating by a bezel clamp;
(c) said body including a lower stem extending from said body;
(d) a longitudinally reciprocating rod having a crowned rack internal to said body and an external end having a contact surface extending out of said lower stem;
(e) each tooth of said crowned rack having a contact arc radius of curvature in the range of from approximately 1.4 inches to approximately 1.6 inches;
(f) said rod being biased out of said body when no longitudinal pressure is applied to said contact surface;
(g) a series of gear assemblies inside said body, said series including a conversion gear assembly, an intermediate gear assembly, a center pinion, and a take up gear assembly, a dial hand attached to the axle of said center pinion, and said take up gear assembly having a hairspring;
(h) said crowned rack driving said conversion gear assembly, said conversion gear assembly driving said intermediate gear assembly, said intermediate gear assembly driving said center pinion, and said center pinion driving said take up gear assembly when said rod is retracting into said body, causing said hairspring to be compressed;
(i) said hairspring uncompressing and causing said take up gear assembly to drive said center pinion when said rod is being projected out of said body, whereby the backlash between said gear assemblies is minimized;
(j) whereby longitudinal pressure on said contact surface causes said rod to retract longitudinally into said body, the distance of retraction being indicated by said dial hand on said dial face.

* * * * *